United States Patent
Xie et al.

(10) Patent No.: US 11,295,454 B1
(45) Date of Patent: Apr. 5, 2022

(54) OBJECT DETECTION METHOD, SECURITY DEVICE, AND READABLE STORAGE MEDIUM

(71) Applicant: Shenzhen Reolink Technology Co., Ltd., Shenzhen (CN)

(72) Inventors: Zhiqiang Xie, Shenzhen (CN); Yulong Que, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/462,008

(22) Filed: Aug. 31, 2021

(30) Foreign Application Priority Data

Apr. 22, 2021 (CN) .......................... 202110440318.1

(51) Int. Cl.
*G06T 7/20* (2017.01)
*G06K 9/62* (2022.01)
(Continued)

(52) U.S. Cl.
CPC .............. *G06T 7/20* (2013.01); *G06K 9/6215* (2013.01); *G06T 7/70* (2017.01); *G06T 7/97* (2017.01);
(Continued)

(58) Field of Classification Search
CPC .... G06T 7/20; G06T 7/97; G06T 7/70; G06T 2207/10016; G06T 2207/30232; G06K 9/6215
See application file for complete search history.

(56) References Cited

U.S. PATENT DOCUMENTS

2017/0169574 A1* 6/2017 Xie .......................... G06T 7/254

FOREIGN PATENT DOCUMENTS

JP 2010015469 A * 1/2010

OTHER PUBLICATIONS

Salih, Maryam A., et al. "Hybrid module for low-cost surveillance system." 2017 6th International Conference on Information and Communication Technology and Accessibility (ICTA). IEEE, 2017. (Year: 2017).*

* cited by examiner

*Primary Examiner* — Vu Le
*Assistant Examiner* — Tracy Mangialaschi
(74) *Attorney, Agent, or Firm* — Idea Intellectual Limited; Margaret A. Burke; Sam T. Yip

(57) ABSTRACT

This application discloses an object detection method, a security device, and a readable storage medium. The object detection method includes: obtaining a plurality of first frames acquired by imaging an object within a first period of time; obtaining a plurality of second frames acquired by imaging the object within a second period of time, where an end time of the first period of time is a start time of the second period of time; comparing each of the second frames with the plurality of first frames one by one to determine whether a position variation of the object between the second frame and the first frame is less than a first preset threshold; if it is determined that the position variation of the object is less than the first preset threshold, increasing a count by one (1) and obtaining a total count after comparison with the plurality of second frames is completed; determining whether the total count reaches a second preset threshold; and if the total count reaches the second preset threshold, determining that the object is stationary; or if the total count does not reach the second preset threshold, determining that the object is moving. This application improves accuracy of a detection method such as an AI detection method in detecting a state of a stationary object and reduces false alarms.

12 Claims, 4 Drawing Sheets

(51) Int. Cl.
*G06T 7/70* (2017.01)
*G06T 7/00* (2017.01)
(52) U.S. Cl.
CPC ............... *G06T 2207/10016* (2013.01); *G06T 2207/30232* (2013.01)

OBJECT DETECTION METHOD, SECURITY DEVICE, AND READABLE STORAGE MEDIUM

CROSS-REFERENCE TO RELATED APPLICATION

The present application claims priority from the Chinese Invention Patent Application No. 202110440318.1 filed on Apr. 22, 2021, and the disclosure of which is incorporated herein by reference in its entirety.

FIELD OF THE INVENTION

This application relates to the technical field of security, and in particular, to an object detection method, a security device, and a readable storage medium.

BACKGROUND OF THE INVENTION

Current video cameras generally have various detection and alarm functions. For example, a video camera may perform motion detection by triggering an alarm when detecting a moving object in an image. Major motion detection methods include: 1. using a mobile sensor; 2. by means of a built-in artificial intelligence (AI) chip or AI algorithm of a video camera, which analyzes a monitored image and content therein in real time, and identifies a specific object based on training of a database and model.

Mobile sensor has poor sensitivity in general, and the motion of the object can be detected only when a coordinate of the object changes greatly. AI detection method has relatively high sensitivity and is widely used in security devices. However, AI detection method has a large detection error when the object is at a stationary state. For example, although an object is stationary, the position of the object may have a small deviation in an image taken by an image sensor every time. In this case, there is change in the coordinate of the object calculated by the AI algorithm, and it is determined that the object is moving, resulting in a false alarm.

SUMMARY OF THE INVENTION

In view of this, embodiments of this application provide an object state detection method, a security device, and a readable storage medium to improve accuracy and reduce false alarms in state detection for stationary objects.

In a first aspect, an object detection method provided in this application includes steps S1 to S62.

S1: Obtain a plurality of first frames acquired by imaging an object within a first period of time.

S2: Obtain a plurality of second frames acquired by imaging the object within a second period of time, where an end time of the first period of time is a start time of the second period of time.

S3: Compare each of the second frames with the plurality of first frames one by one to determine whether a position variation of the object between the second frame and the first frame is less than a first preset threshold.

S4: If it is determined that the position variation of the object is less than the first preset threshold, increase a count by one (1) and obtain a total count after comparison with the plurality of second frames is completed.

S5: Determine whether the total count reaches a second preset threshold. If the total count reaches the second preset threshold, perform step S61: Determine that the object is stationary. If the total count does not reach the second preset threshold, perform step S62: Determine that the object is moving.

In some embodiments, the plurality of first frames are stored in a first data chain in a chronological order.

In some embodiments, coordinates of the object in the second frames are stored in a tail end of a second data chain in a first-in, first-out (FIFO) order.

In some embodiments, after determining that the total count is less than the second preset threshold and before determining that the object is moving, the method includes: determining whether the coordinates of the object in the second frames are coordinates stored in the second data chain; and if the coordinates of the object in the second frames are coordinates stored in the second data chain, determining that the object is stationary; or if the coordinates of the object in the second frames are not coordinates stored in the second data chain, determining that the object is moving.

In some embodiments, after obtaining a current detected result by determining whether the total count reaches a second preset threshold and before the determining that the object is stationary or the determining that the object is moving, the method includes: obtaining a detected result of a state of the object from a sensor; determining whether the current detected result is the same as the detected result from the sensor; and if the current detected result is the same as the detected result from the sensor, determining the state of the object by using the current detected result; or if the current detected result is not the same as the detected result from the sensor, determining the state of the object by using one of the current detected result and the detected result from the sensor according to a preset rule.

In some embodiments, a start time of the first period of time is an initial time of imaging the object, and duration of the second period of time is less than duration of the first period of time.

A security device provided in this application includes an imaging unit and a processing unit. The imaging unit is configured to obtain a plurality of first frames acquired by imaging the object within a first period of time and a plurality of second frames acquired by imaging the object within a second period of time, where an end time of the first period of time is a start time of the second period of time. The processing unit is configured to compare each of the second frames with the plurality of first frames one by one to determine whether a position variation of the object between the second frame and the first frame is less than a first preset threshold; if it is determined that the position variation of the object is less than the first preset threshold, increase a count by one (1) and obtain a total count after comparison with the plurality of second frames is completed; further determine whether the total count reaches a second preset threshold; and if the total count reaches the second preset threshold, determine that the object is stationary; or if the total count does not reach the second preset threshold, determine that the object is moving.

In some embodiments, after determining that the total count reaches the second preset threshold and before determining that the object is moving, the processing unit is further configured to: determine whether coordinates of the object in second frames are coordinates stored in a second data chain, where the second data chain is configured to store the coordinates of the stationary object in the second frames; and if the coordinates of the object in the second frames are coordinates stored in the second data chain, determine that the object is stationary; or if the coordinates of the object in the second frames are not coordinates stored in the second data chain, determine that the object is moving. After determining that the object is stationary, the processing unit is further configured to store the coordinates of the object in the second frames in the second data chain.

In some embodiments, the security device further includes a sensing unit. The sensing unit is configured to detect a state of the object and obtain a current detected result. Before determining that the object is stationary or determining that the object is moving, the processing unit is further configured to: determine whether the current detected result is the same as detected results from the sensing unit; and if the current detected result is the same as a detected result from the sensing unit, determine the state of the object by using the same detected result; or if the current detected result is not the same as the detected results from the sensing unit, determine the state of the object by using one of the detected results according to a preset rule.

A readable storage medium provided in this application stores a program. The program is performed by a processor to implement any one of the foregoing object detection methods.

In the object detection method, security device, and readable storage medium of this application, by comparing object images taken in different periods of time, a total number of times when the position variation of the object is large (i.e. exceeding the first preset threshold) in different periods of time is determined, to determine whether the object is stationary or moving. When the total number of times is small (i.e. less than the second preset threshold), it is determined that the object is stationary, and conversely, it is determined that the object is moving. It can be seen that this application does not determine that the object is moving when it is determined that the position variation of the object is large, nor determine that the object is stationary when it is determined that the position variation of the object is small. Instead, the state detection is based on the total number of occurrences, thereby improving the accuracy of state detection of the object (including a stationary object) and reducing the possibility of false alarms. For example, for an AI test method, the detection error of a stationary object is reduced, thereby increasing a user's approval and acceptance of the AI detection method.

DETAILED DESCRIPTION

To clearly states the objectives, technical solutions, and advantages of this application, the technical solutions of this application will be clearly and completely described below with reference to embodiments of this application and the accompanying drawings. Apparently, the described embodiments are merely some rather than all of the embodiments of this application. Based on the embodiments of this application, the following embodiments and their technical features may be combined with each other without conflict.

Figure 1:
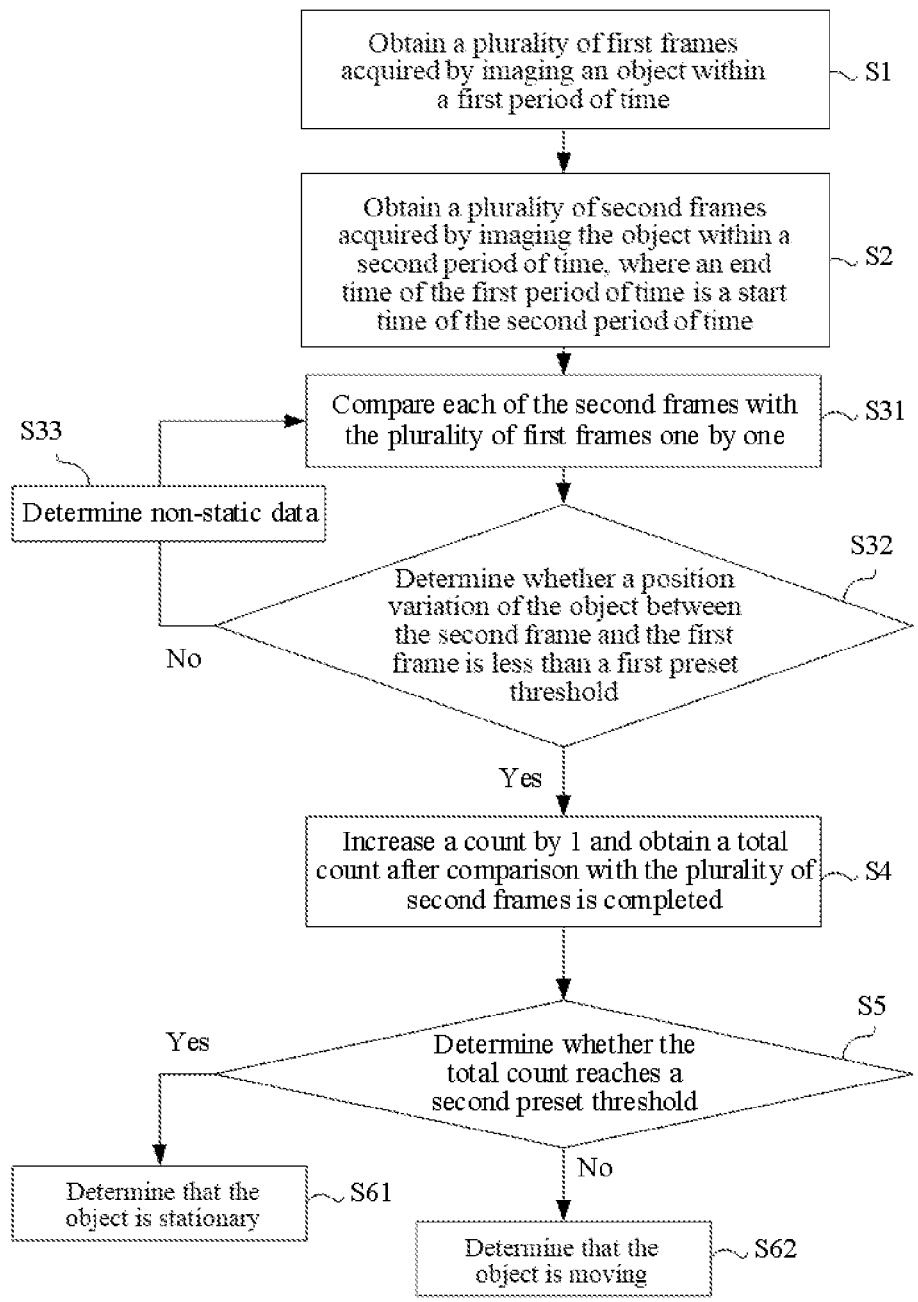
FIG. 1 is a schematic flowchart of an object detection method according to a first embodiment of this application.

FIG. 1 is a schematic flowchart of an object detection method according to a first embodiment of this application. Referring to FIG. 1, the object detection method includes the following steps S1 to S62.

S1: Obtain a plurality of first frames acquired by imaging an object within a first period of time.

S2: Obtain a plurality of second frames acquired by imaging the object within a second period of time, where an end time of the first period of time is a start time of the second period of time.

A body for performing the steps of the method is not limited in the embodiment and may be determined according to requirements of an actual scenario. For example, the body may be various electronic devices having imaging functions that include but are not limited to monitoring devices such as a camera for a security field. For another example, the body may be an electronic device having an arithmetic processing function that may not have an imaging function, where the first frames and the second frames may be taken by an external imaging device and obtained from the external imaging device.

Figure 2:
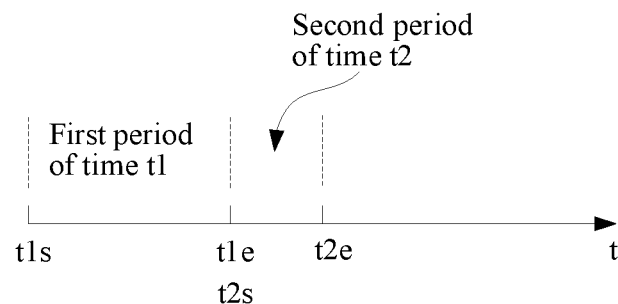
FIG. 2 is a schematic timing diagram of a first period of time and a second period of time of this application.

In some embodiments, a start time of the first period of time may be an initial time of imaging an object, for example, a time when an electronic device is turned on or a start time of imaging the object after focusing is completed. As shown in FIG. 2, duration of a first period of time t1 is a time difference from a start time t1s to an end time t1e, the end time t1e of the first period of time t1 is a start time t2s of a second period of time t2, and duration of the second period of time t2 is a time difference from the start time t2s to an end time t2d.

The duration of the second period of time t2 is less than the duration of the first period of time t1, and therefore duration of a sampled object image is shortened, thereby improving accuracy of detecting a state of the object.

The number of the first frames is proportional to the duration of the first period of time, and similarly, the number of the second frames is proportional to the duration of the second period of time. It can be understood that a longer imaging time indicates a larger number of frames obtained. For example, if the camera takes 10 pictures per second and the duration of the first period of time is 3 seconds, 30 first frames are obtained in step S1.

It should be understood that in some embodiments, this application may set the number of the first and second frames alone or in combination with operational performance of an AI algorithm. For example, in a scenario where the AI algorithm can only process 7 pictures per second, even if the camera takes 10 pictures per second, 7 pictures are finally selected to set the first frames and/or the second frames. For example, 21 first frames are obtained in step S1. The rule for selecting pictures is not limited in the embodiments of this application. For example, the clearest 7 pictures may be selected, or 7 pictures taken at times closest to the second period of time may be selected.

In some scenarios, the plurality of first frames may be stored in a first data chain in a chronological order, which facilitates invocation of the first frames and comparison in step S3. The first data chain is a storage space, such as a system buffer area of an electronic device or a storage space of an external memory.

S31: Compare each of the second frames with the plurality of first frames one by one.

S32: Determine whether a position variation of the object between the second frame and the first frame is less than a first preset threshold.

S4: If it is determined that the position variation of the object is less than the first preset threshold, increase a count by one (1) and obtain a total count after comparison with the plurality of second frames is completed.

Figure 3:
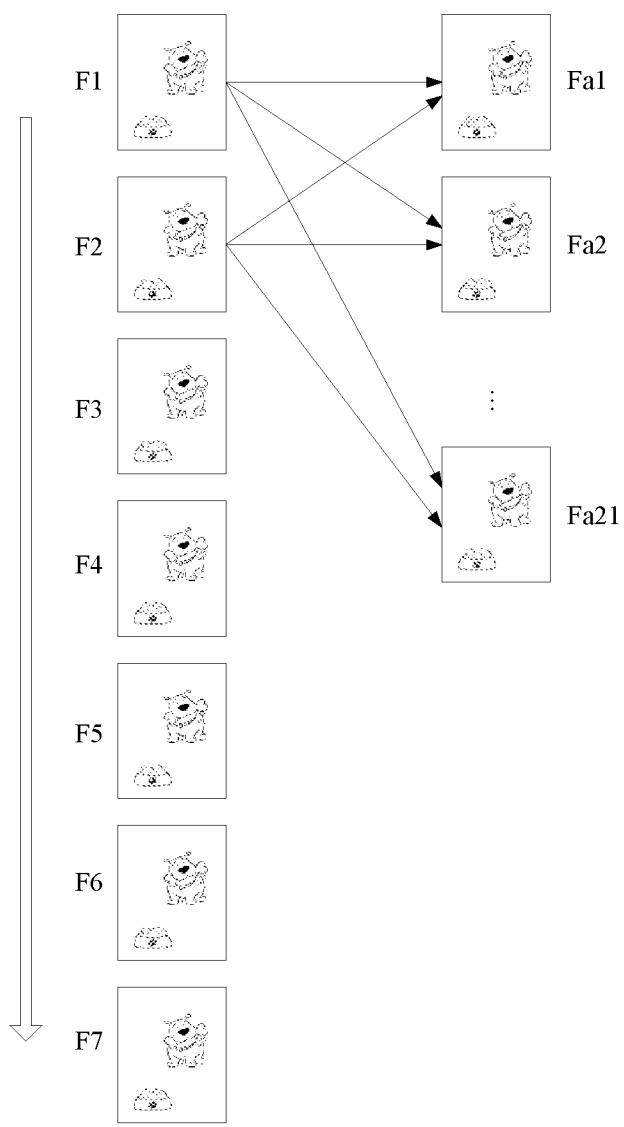
FIG. 3 is a schematic diagram of comparison between second frames and first frames according to an embodiment of this application.

For example, in the scenario shown in FIG. 3, the object is a puppy. Seven second frames (numbered F1 ... F7) and 21 first frames (numbered Fa1, Fa2, ... Fa21) are obtained. First, the second frame F1 is compared with the 21 first frames one by one, to determine whether a position variation of the object between the second frame F1 and the first frame Fa2 is less than the first preset threshold, determine whether the position variation of the object between the second frame F1 and the first frame Fa2 is less than the first preset threshold, and so on, until determine whether the position variation of the object between the second frame F1 and the first frame Fa21 is less than the first preset threshold. Then, the second frame F2 is compared with the 21 first frames one by one and the remaining second frames each are compared with the 21 first frames one by one accordingly.

In some embodiments, in step S32, the position variation of the object may be identified based on coordinate variations on an x-axis, a y-axis, and a z-axis in a three-dimensional rectangular coordinate system. If the coordinate variations on the three axes are all less than the first preset threshold, it is determined that the position variation of the object is less than the first preset threshold.

For example, the first preset threshold is d0, coordinates of the object in the second frame F1 are (x1, y1, z1), and coordinates in the first frame Fa2 are (x2, y2, z2). If $|x1-x2|<d0$, $|y1-y2|<d0$, and $|z1-z2|<d0$, it is determined that the coordinate variation of the object between the second frame F1 and the first frame Fa2 is less than the first preset threshold. If the coordinate variation on one axis, two axes, or three axes is greater than the first preset threshold, it is determined that the coordinate variation of the object between the second frame F1 and the first frame Fa2 is greater than or equal to the first preset threshold. For example, if $|x1-x2|>d0$, even if $|y1-y2|<d0$ and $|z1-z2|<d0$, it is determined that the coordinate variation of the object between the second frame F1 and the first frame Fa2 is greater than the first preset threshold.

If it is determined that the position variation of the object is greater than or equal to the first preset threshold, step S33 may be performed: Determine non-static data, and steps S31 and S32 are continued to be performed.

After the comparison of all the second frames F1 ... F7 is completed, a total count is obtained. The total count may be used for identifying the number of cases in which there is no relatively great variation in coordinates of the object between the first frame and the second frame, and a greater number indicates a greater likelihood that the variation can be identified as position deviation caused by image sensor imaging, rather than the displacement of the object due to its movement, that is, indicates a greater probability at which the object is stationary.

S5: Determine whether the total count reaches a second preset threshold. If the total count reaches the second preset threshold, perform step S61: Determine that the object is stationary. If the total count does not reach the second preset threshold, perform step S62: Determine that the object is moving.

The embodiment of this application does not determine that the object is moving when detecting that the position variation of the object in the former and the latter frames is large, and that the object is stationary when the position variation of the object is small. Instead, based on a plurality of frames in the former and the latter periods of time, the total number of occurrences is obtained through frames comparison and serves as the basis of state detection, thereby improving the accuracy of state detection the object (including a stationary object). The method may be applicable to the field of security. For example, when detecting that the object is moving, possibility of false alarms can be reduced.

The steps of the foregoing methods may be realized by running an AI algorithm. Therefore, for the AI detection method, a detection error caused by a stationary object can be filtered out, the accuracy of the AI detection method can be improved, and a user's approval of the AI detection method can be increased.

Figure 4:
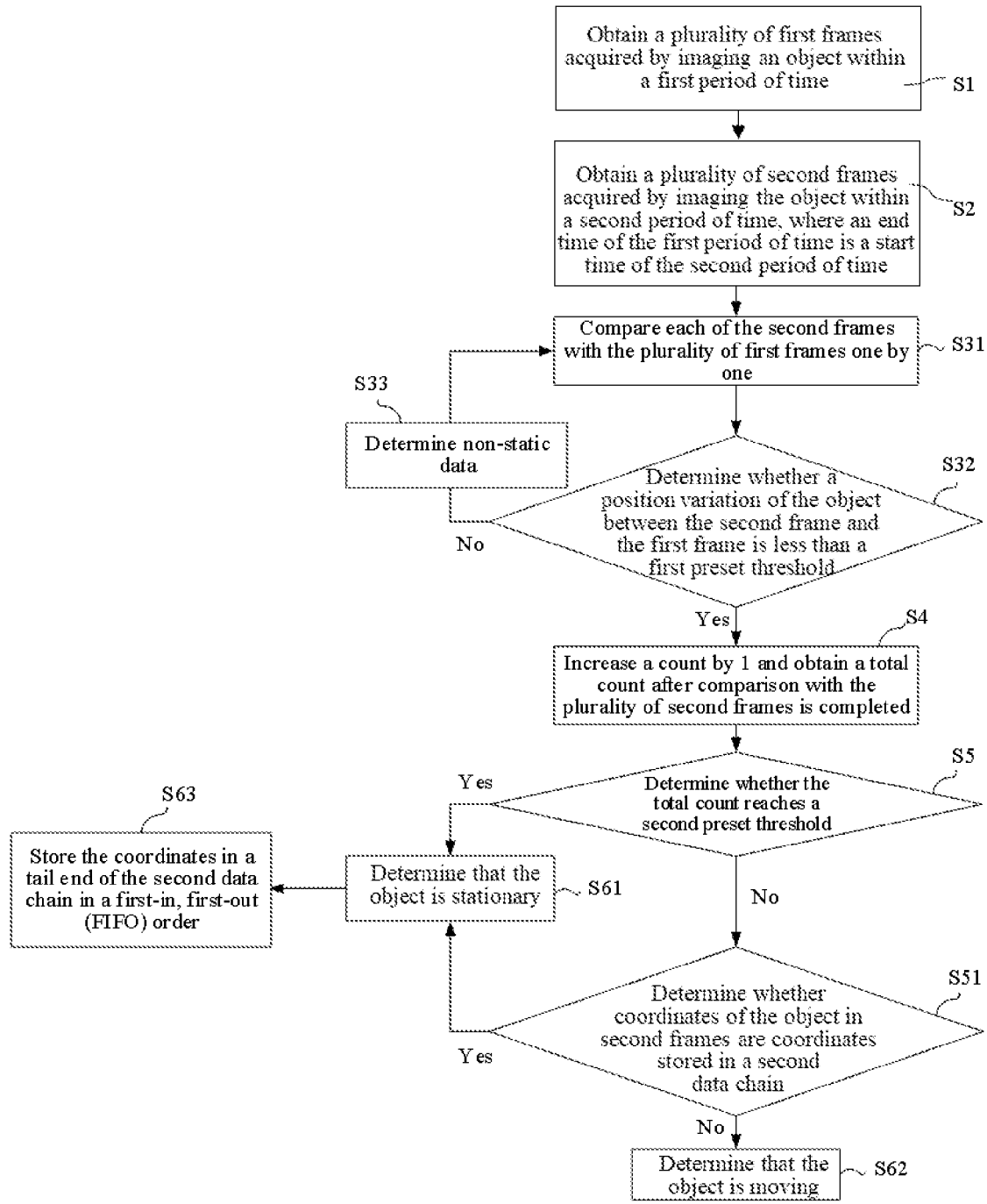
FIG. 4 is a schematic flowchart of an object detection method according to a second embodiment of this application.

FIG. 4 is a schematic flowchart of an object detection method according to a second embodiment of this application. Referring to FIG. 4, the object detection method includes the following steps S1 to S62.

S1: Obtain a plurality of first frames acquired by imaging an object within a first period of time.

S2: Obtain a plurality of second frames acquired by imaging the object within a second period of time, where an end time of the first period of time is a start time of the second period of time.

S31: Compare each of the second frames with the plurality of first frames one by one.

S32: Determine whether a position variation of the object between the second frame and the first frame is less than a first preset threshold.

S4: If it is determined that the position variation of the object is less than the first preset threshold, increase a count by one (1) and obtain a total count after comparison with the plurality of second frames is completed.

S5: Determine whether the total count reaches a second preset threshold.

If the total count reaches the second preset threshold, perform step S61: Determine that the object is stationary. If the total count does not reach the second preset threshold, perform step S51: Determine whether coordinates of the object in second frames are coordinates stored in a second data chain.

If the coordinates of the object in second frames are coordinates stored in the second data chain, perform step S61: Determine that the object is stationary, and S63: Store the coordinates in a tail end of the second data chain in an FIFO order.

If the coordinates of the object in the second frames are not coordinates stored in the second data chain, perform step S62: Determine that the object is moving.

Based on the description of the embodiment described in FIG. 1, the difference lies in that, in this embodiment, the coordinates data of the stationary object is stored in the second data chain every time after it is determined that the object is stationary, which is equivalent to continuously updating the coordinates data of the object in the stationary state (i.e., static data keeps updating), so as to improve the accuracy of state detection of the object. For example, in a chronological order, position deviation caused by the image sensor during imaging may constantly increase. For example, when the coordinate variation of the object between the second frame F1 and the first frame Fa2 is large and is greater than the first preset threshold, it is mistakenly considered that the object is moving, but in fact the object does not move. To this end, this embodiment stores the latest static data in the second data chain, which is equivalent to continuously updating the static data, thereby helping reduce such false detections.

It should be understood that one or more of the first preset threshold, the second preset threshold, the storage size of the first data chain, and the storage size of the second data chain may be adaptively set according to an actual requirement. Detection sensitivity may be adjusted by adjusting the thresholds, so that the detection sensitivity can be adaptively adjusted according to different scenarios, thereby further filtering false detections caused by stationary objects.

This embodiment may combine any of the above methods with a detected result from the sensor to comprehensively detect the state of the object. In some embodiments, after obtaining a current detected result by determining whether the total count reaches a second preset threshold and before determining that the object is stationary or determining that the object is moving, the method further includes: obtaining a detected result of a state of the object from a sensor; determining whether the current detected result is the same as the detected result from the sensor. If the current detected result is the same as the detected result from the sensor, the state of the object is determined by using the current detected result. For example, if it is determined, by using both of the detection methods, that the object is moving, it is finally determined that the object is moving. If the current detected result is not the same as the detected result from the sensor, the state of the object is determined by using one of the current detected result and the detected result from the sensor according to a preset rule. For example, the preset rule is that a detected result of the AI detection method is used as the state of the object, or the preset rule is that a detected result from a mobile sensor is used as the state of the object.

In some scenarios, the sensor includes but is not limited to a mobile sensor, an infrared sensor, and a sensor based on a Passive Infrared (PIR) technology.

The preset rule may be adaptively set according to a residence scene of the object. For example, in indoor and outdoor scenes, no real person can keep completely stationary, while only a toy doll or a statue can do. If the object detected by the sensor is a real person, even if AI detects that the object is stationary, a final detected result is determined to be that the object is moving.

Figure 5:
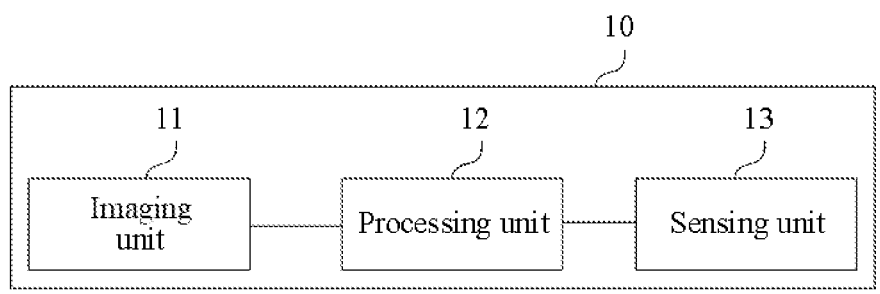
FIG. 5 is a schematic structural diagram of a security device according to an embodiment of this application.

An embodiment of this application further provides a security device. As shown in FIG. 5, a security device 10 includes at least an imaging unit 11 and a processing unit 12.

The imaging unit 11 is configured to obtain a plurality of first frames acquired by imaging the object within a first period of time and a plurality of second frames acquired by imaging the object within a second period of time, where an end time of the first period of time is a start time of the second period of time.

The processing unit 12 is configured to compare each of the second frames with the plurality of first frames one by one to determine whether a position variation of the object between the second frame and the first frame is less than a first preset threshold; if it is determined that the position variation of the object is less than the first preset threshold, increase a count by one (1) and obtain a total count after comparison with the plurality of second frames is completed; further determine whether the total count reaches a second preset threshold; and if the total count reaches the second preset threshold, determine that the object is stationary; or if the total count does not reach the second preset threshold, determine that the object is moving.

In some embodiments, after determining that the total count reaches the second preset threshold and before determining that the object is moving, the processing unit 12 is further configured to: determine whether coordinates of the object in the second frames are coordinates stored in the second data chain; and if the coordinates of the object in the second frames are coordinates stored in the second data chain, determine that the object is stationary; or if the coordinates of the object in the second frames are not coordinates stored in the second data chain, determine that the object is moving. After determining that the object is stationary, the processing unit 12 is further configured to store the coordinates of the object in the second frames in the second data chain.

In some embodiments, the security device further includes a sensing unit 13. The sensing unit 13 is configured to detect a state of the object and obtain a current detected result. Before determining that the object is stationary or determining that the object is moving, the processing unit 12 is further configured to: determine whether the current detected result is the same as detected results from the sensing unit 13; and if the current detected result is the same as a detected result from the sensing unit 13, determine the state of the object by using the same detected result; or if the current detected result is not the same as the detected results from the sensing unit 13, determine the state of the object by using one of the detected results according to a preset rule.

The processing unit 12 is a control center of the security device 10, and is connected to various parts of the security device 10 by using various interfaces and lines. By running or loading a program stored in a memory, and invoking data stored in the memory, the processing unit 12 performs various functions and data processing of the security device 10, thereby implementing the steps in the method of any of the above embodiments.

It should be understood that within specific implementation in actual application scenarios, depending on the device type to which the security device 10 pertains, the above steps may not be performed by the imaging unit 11, processing unit 12, and the sensing unit 13, but are implemented respectively by other modules and units.

A person of ordinary skill in the art may understand that, all or some steps of the methods in the foregoing embodiments may be implemented by using instructions, or implemented through instructions controlling relevant hardware, and the instructions may be stored in a readable storage medium and loaded and executed by a processor. To this end, an embodiment of this application provides a readable storage medium storing a program, and the program can be loaded by a processor to perform one or more steps in any one of the object detection methods according to the embodiments of this application.

The readable storage medium may include a read-only memory (ROM), a random access memory (RAM), a magnetic disk, an optical disc, or the like.

Because the program stored in the readable storage medium may perform one or more steps of any object detection method provided in the embodiments of this application, the program can implement beneficial effects that may be implemented by any object detection method provided in the embodiments of this application. For details, reference may be made to the foregoing embodiments. Details are not described herein again.

The foregoing descriptions are merely a part of the embodiments of this invention, and the protection scope of this application is not limited thereto. All equivalent structure changes made according to the content of this specification and accompanying drawings shall fall within the protection scope of this application.

Without more restrictions, the element defined by the sentence "including a . . . " does not exclude presence of other same elements in the process, method, article, or apparatus that includes the element. In addition, components, features, and elements with the same name in different embodiments may have the same meaning or different meanings, and their specific meanings need to be determined according to their explanations in the specific embodiment or further with reference to the context in the specific embodiment.

Further, although the terms such as "first," "second," and "third," are used in this application to describe various information, the information should not be limited to these terms. These terms are merely used to distinguish between information of the same type. As used herein, singular forms "a", "an" and "the" are intended to also include plural forms. The terms "or" and "and/or" are interpreted as inclusive, or mean any one or any combination. An exception to this definition may occur only when the combination of elements, functions, steps, or operations is inherently mutually exclusive in some way.

What is claimed is:

1. An object detection method, comprising:
   obtaining a plurality of first frames acquired by imaging an object within a first period of time;
   obtaining a plurality of second frames acquired by imaging the object within a second period of time, wherein an end time of the first period of time is a start time of the second period of time;
   comparing each of the second frames with the plurality of first frames one by one to determine whether a position variation of the object between the second frame and the first frame is less than a first preset threshold;
   if it is determined that the position variation of the object is less than the first preset threshold, increasing a count by one and obtaining a total count after comparison with the plurality of second frames is completed;
   determining whether the total count reaches a second preset threshold;
   obtaining a detected result of a state of the object from a sensor;
   determining whether a current detected result obtained by determining whether the total count reaches the second preset threshold is the same as the detected result from the sensor; and
   if the current detected result is the same as the detected result from the sensor, determining the state of the object by using the current detected result; or if the current detected result is not the same as the detected result from the sensor, determining the state of the object by using one of the current detected result and the detected result from the sensor according to a preset rule; and
   if the total count reaches the second preset threshold, determining that the object is stationary; or if the total count does not reach the second preset threshold, determining that the object is moving.

2. The method according to claim 1, wherein the plurality of first frames are stored in a first data chain in a chronological order.

3. The method according to claim 1, wherein after the determining that the object is stationary, the method comprises: storing coordinates of the object in the second frames in a tail end of a second data chain in a first-in, first-out (FIFO) order.

4. The method according to claim 3, wherein
   after determining that the total count reaches the second preset threshold and before the determining that the object is moving, the method comprises: determining whether the coordinates of the object in the second frames are coordinates stored in the second data chain; and
   if the coordinates of the object in the second frames are coordinates stored in the second data chain, determining that the object is stationary; or if the coordinates of the object in the second frames are not coordinates stored in the second data chain, determining that the object is moving.

5. The method according to claim 1, wherein a start time of the first period of time is an initial time of imaging the object, and duration of the second period of time is less than duration of the first period of time.

6. A non-transitory computer readable storage medium storing a program, wherein the program is performed by a processor to implement the object detection method according to claim 1.

7. The non-transitory computer readable storage medium according to claim 6, wherein the plurality of first frames are stored in a first data chain in a chronological order.

8. The non-transitory computer readable storage medium according to claim 6, wherein after the determining that the object is stationary, the object detection method comprises: storing coordinates of the object in the second frames in a tail end of a second data chain in a first-in, first-out (FIFO) order.

9. The non-transitory computer readable storage medium according to claim 8, wherein
   after determining that the total count reaches the second preset threshold and before the determining that the object is moving, the object detection method comprises:
   determining whether the coordinates of the object in the second frames are coordinates stored in the second data chain; and
   if the coordinates of the object in the second frames are coordinates stored in the second data chain, determining that the object is stationary; or if the coordinates of the object in the second frames are not coordinates stored in the second data chain, determining that the object is moving.

10. The non-transitory computer readable storage medium according to claim 6, wherein a start time of the first period of time is an initial time of imaging the object, and duration of the second period of time is less than duration of the first period of time.

11. A security device, comprising:
    an imaging unit, configured to obtain a plurality of first frames acquired by imaging an object within a first period of time and a plurality of second frames acquired by imaging the object within a second period of time, wherein an end time of the first period of time is a start time of the second period of time;
    a processing unit, configured to compare each of the second frames with the plurality of first frames one by one to determine whether a position variation of the object between the second frame and the first frame is less than a first preset threshold; and if it is determined that the position variation of the object is less than the first preset threshold, increase a count by one and obtain a total count after comparison with the plurality of second frames is completed; and a sensing unit configured to detect a state of the object and obtain a detected result; wherein the processing unit is further configured to:

determine whether the total count reaches a second preset threshold;

determine whether a current detected result obtained by determining whether the total count reaches the second preset threshold is the same as the detected result from the sensing unit;

if the current detected result is the same as the detected result from the sensing unit, determine the state of the object by using the current detected result; or if the current detected result is not the same as the detected result from the sensing unit, determine the state of the object by using one of the current detected result and the detected result from the sensing unit according to a preset rule; and if the total count reaches the second preset threshold, determine that the object is stationary; or if the total count does not reach the second preset threshold, determine that the object is moving.

12. The security device according to claim 11, wherein the processing unit is further configured to set a second data chain configured to store coordinates of a stationary object in the second frames;

after determining that the total count reaches the second preset threshold and before determining that the object is moving, the processing unit is further configured to determine whether the coordinates of the object in the second frames are coordinates stored in the second data chain; and if the coordinates of the object in the second frames are coordinates stored in the second data chain, determine that the object is stationary; or if the coordinates of the object in the second frames are not coordinates stored in the second data chain, determine that the object is moving; and after determining that the object is stationary, the processing unit is further configured to store the coordinates of the object in the second frames in the second data chain.

* * * * *